(12) United States Patent
Basler et al.

(10) Patent No.: US 9,047,280 B2
(45) Date of Patent: Jun. 2, 2015

(54) APPARATUS AND METHOD FOR POSITION DETERMINATION (71) Applicants: SICK STEGMANN GmbH, Donaueschingen (DE); ATLANTIC ZEISER GmbH, Emmingen (DE)

(72) Inventors: Stefan Basler, Brigachtal (DE); Trevor Stewart, Gaienhofen (DE); Karl-Heinz Wohlfahrt, Bodman-Ludwigshafen (DE)

(73) Assignees: SICK STEGMANN GMBH, Donaueschingen (DE); ATLANTIC ZEISER GMBH, Emmingen (DE)

( * ) Notice: Subject to any disclaimer, the term of this patent is extended or adjusted under 35 U.S.C. 154(b) by 256 days.

(21) Appl. No.: 13/760,633

(22) Filed: Feb. 6, 2013

(65) Prior Publication Data

US 2013/0206831 A1   Aug. 15, 2013

(30) Foreign Application Priority Data

Feb. 10, 2012   (EP) ..................... 12000886

(51) Int. Cl.
*G06F 17/30* (2006.01)
*G01D 5/244* (2006.01)
(Continued)

(52) U.S. Cl.
CPC ........ *G06F 17/30002* (2013.01); *G01D 5/2448* (2013.01); *G01D 5/2455* (2013.01); *G01D 5/347* (2013.01); *G01D 5/34792* (2013.01); *G05D 1/0234* (2013.01); *G05D 2201/0216* (2013.01)

(58) Field of Classification Search
USPC ............... 235/375, 376, 385, 462.22, 462.31, 235/462.08
See application file for complete search history.

(56) References Cited

U.S. PATENT DOCUMENTS

| | | |
|---|---|---|
| 5,448,050 A | 9/1995 | Kostizak |
| 5,633,489 A | 5/1997 | Dvorkis et al. |

(Continued)

FOREIGN PATENT DOCUMENTS

| | | |
|---|---|---|
| DE | 19744441 A1 | 4/1999 |
| DE | 20 2006 012 637 U1 | 12/2006 |

(Continued)

OTHER PUBLICATIONS

European Search Report dated Jun. 28, 2012.
(Continued)

*Primary Examiner* — Allyson Trail
(74) *Attorney, Agent, or Firm* — Nath, Goldberg & Meyer; Jerald L. Meyer; Leonid D. Thenor (57) ABSTRACT

An apparatus for position determination has an optical scanning unit which is to be moved relative to a surface and which includes an image sensor for detecting light intensity patterns of light which is reflected by the surface. The apparatus furthermore has an electronic processing unit which is associated with the image sensor and configured to determine a traveled movement path and/or a movement speed of the optical scanning unit relative to the surface from a difference between light intensity patterns detected after one another in time. A further processing unit is configured to produce an intensity correlated signal which correlates with the intensity of the light reflected by the surface. An evaluation device is associated with the image sensor and is configured to recognize a graphical code pattern located on the surface with reference to the intensity correlated signal and to read out information from the code pattern.

16 Claims, 5 Drawing Sheets (51) Int. Cl.
*G01D 5/245* (2006.01)
*G01D 5/347* (2006.01)
*G05D 1/02* (2006.01)

(56) References Cited

U.S. PATENT DOCUMENTS

| | | | |
|---|---|---|---|
| 7,000,839 B2 * | 2/2006 | Good et al. | 235/462.14 |
| 7,137,556 B1 * | 11/2006 | Bonner et al. | 235/462.08 |
| 2003/0234289 A1 * | 12/2003 | Uhl et al. | 235/454 |
| 2006/0208058 A1 * | 9/2006 | Kodama et al. | 235/376 |
| 2010/0025464 A1 * | 2/2010 | Trueeb et al. | 235/385 |
| 2011/0007155 A1 | 1/2011 | Aki | |

FOREIGN PATENT DOCUMENTS

| | | |
|---|---|---|
| EP | 1420229 A1 | 5/2004 |
| EP | 1517119 A1 | 3/2005 |
| EP | 1617173 A2 | 1/2006 |

OTHER PUBLICATIONS

"Agilent ADNS-2030 Low Power Optical Mouse Sensor Data Sheet", Agilent Technologies, May 6, 2003, XP055085617, thirty-four (34) pages.

Article: Junguk Cho, et al: "A Real-Time Histogram Equalization System with Automatic Gain Control Using FPGA", Aug. 1, 2010, XP055164755.

* cited by examiner

APPARATUS AND METHOD FOR POSITION DETERMINATION

The present invention relates to an apparatus for position determination having an optical scanning unit which is to be moved relative to a surface, the optical scanning unit including an image sensor for detecting light intensity patterns of light which is reflected by the surface and having an electronic processing unit which is associated with the image sensor and which is configured to determine a traveled movement path and/or a movement speed of the optical scanning unit relative to the surface from a difference between light intensity patterns detected after one another in time, with the one or a further processing unit being configured to produce an intensity correlated signal which correlates with the intensity of the light reflected by the surface.

Such apparatus serve, for example, to determine the position of a movable machine part relative to a stationary frame or to determine the position of a vehicle on a transport path. Length measurements can also be carried out using apparatus of the named kind. To enable an exact determination of the movement path or of the movement speed, the surface can be structured in a specific manner. This is, however, not absolutely necessary since a number of surfaces anyway have slight variations which are sufficient for generating a light intensity pattern on the image sensor which can be evaluated. The surface can accordingly be any desired surface reflecting the light directly or diffusely at an object, with in particular planar surfaces being able to be considered. For example, the optical scanning unit can be moved along a measurement rail over a plate or also simply over the ground. Such measuring apparatus are also called optical position encoders or optical encoders.

The intensity correlated signal can be used to adapt or set different system components such that the image sensor and/or the processing unit work in a favorable range so that the apparatus can be used at surfaces with very different or varying degrees of reflection, that is e.g. both at white and at black surfaces.

The evaluation of a difference between light intensity patterns detected after one another in time naturally only allows an incremental position determination, i.e. in principle only position changes can be detected. To determine the absolute position, a comparison with a suitable reference value or zero value is additionally required. This can take place, for example, by provision of mechanical limit switches at the start and at the end of the movement path. However, this is associated with a relatively high manufacturing and installation effort and/or cost.

It is an object of the invention to further develop an apparatus of the above-named kind such that extended functions are provided with small effort and in particular determinations of the absolute position are possible.

The object is satisfied by an apparatus having the features of claim 1.

In accordance with the invention, an evaluation device is associated with the image sensor and is configured to recognize a graphical code pattern located on the surface with reference to the intensity correlated signal and to read out information from the code pattern.

The intensity correlated signal is therefore not only optionally used for level adaptation, but also for reading out code patterns applied to the surface. The information read out of the code patterns can be further processed in various manners and can deliver important data on the state of the total system. It is of particular advantage in this respect that no separate devices and no corresponding calibration measures are required for providing the additional information, but rather that one and the same optical scanning unit both determines the movement path and reads graphical codes. In contrast to known systems, only one transmitter and one receiver are necessary so that the apparatus is particularly compact and inexpensive.

A determination of the movement path by evaluation of the time change of light intensity patterns also takes place with electronic pointing devices such as optical mouse devices for computers. The principle applied in this respect is also called "optical flow". Furthermore, mouse devices for computers are known which are equipped with a so-called trackball for determining the movement path and additionally with an optical code reader, e.g. a barcode reader. Such mouse devices with trackballs and code readers are disclosed in the documents DE 197 44 441 A1, U.S. Pat. No. 5,448,050 and U.S. Pat. No. 5,633,489. In these systems, two independent detection systems which work completely separately from one another are always required. This requires not only a comparatively large construction space, but is also associated with considerable manufacturing costs. In contrast, the simultaneous utilization of the optical scanning unit provided in accordance with the invention for determining the movement path and for reading codes allows a space-saving and inexpensive design of a position encoder.

Further developments of the invention are set forth in the dependent claims, in the description and in the enclosed Figures.

The evaluation device is preferably configured to derive a spatial development of the degree of reflection of the surface given by the code pattern for the recognition of the graphical code pattern from the time development of the intensity correlated signal during a movement of the optical scanning unit relative to the surface. In other words, the time fluctuations of the intensity correlated signal, which represent the differently reflective regions of a scanned graphical code pattern, are interpreted directly as a code pattern by the evaluation device. There are thus in particular no complex and complicated readout algorithms necessary so that the corresponding expensive electronic modules, including the corresponding interconnections, can also be saved.

The optical scanning unit preferably includes a light source for illuminating the surface, in particular a light-emitting diode or a laser diode. Structures present on the surface can be better recognized by the illumination of the surface and can accordingly be resolved more reliably. The spectral radiation power of the light source can be adapted in a special manner to the image sensor and/or to the kind of surface. Furthermore, a narrow-band bandpass filter can be arranged between the surface and the image sensor for filtering interfering light.

The evaluation device can be integrated into the electronic processing unit. The construction space taken up is minimized in this embodiment.

Alternatively, the evaluation device can be designed as a further electronic processing unit. This provides the advantage that a commercially available electronic processing unit can be used for determining the movement path which only has to be connected to an additional electronic processing unit.

A regulator can furthermore be provided which uses the intensity correlated signal as an adjustment signal for regulating an input gain of the processing unit or of the line of a light source of the optical scanning unit. The intensity correlated signal can e.g. adjust an input amplifier which can be regulated and which is connected before the processing unit, i.e. to adapt the gain factor for the signals of the image sensor.

Alternatively, the intensity correlated signal can adjust an output amplifier for the light source which can be regulated and is connected after the processing unit in order thus to adapt the illuminance. In this manner, a substantially unchanging total intensity can always be maintained and thus the dynamics of the system improved even with very differently reflective surfaces.

In this connection, it must be pointed out that the intensity correlated signal correlates with the light intensity reflected in total by the surface, that is it is not related to individual picture elements of the image sensor, but can rather include e.g. a mean value signal, a summed signal or an integral signal with respect to the total image sensor.

The evaluation device can furthermore be configured to read out from the code pattern at least one position value representing the position of the optical scanning unit relative to a reference point of the surface. The position value can be used within the framework of the determination of the movement path as an absolute reference value, e.g. in the form of a zero point, in order thus to allow an absolute position determination. For this purpose, position marks in the form of graphical code patterns can be applied to the surface at regular intervals.

Furthermore, the evaluation device can be configured to read out information from the code pattern which describes a property of a reference point defined by the position of the code pattern on the surface, in particular product identification information. The code patterns can, for example, be provided in a goods store and can mark the goods or products stored at the respective position. The property of the reference point can, however, also be other abstract information. The code pattern could, for example, indicate whether a branching of the movement paths is imminent.

In accordance with a preferred embodiment of the invention, the evaluation device is configured to recognize a barcode. Such codes can easily be recognized by optical sampling or scanning since they were specifically developed for good recognizability. If multiple scanning takes place at different points, for example a row-wise scanning, a matrix code can also be read out.

The invention also relates to a system having an apparatus in accordance with the invention for position determination as described above and having at least one information element designed for application to a surface, said information element including at least one graphical code pattern recognizable by the evaluation device. The information element can e.g. include a thin carrier, preferably a flexible carrier, on whose upper side the graphical code pattern is printed. Within the framework of the putting into operation of the system, the lower side of the carrier is attached to the desired point at the surface, for example is adhered thereto.

The invention furthermore relates to a transport system having a vehicle for conveying goods along a predefined transport path and having an apparatus such as described above for determining the position of the vehicle on the transport path.

In accordance with the invention, at least one code pattern is arranged at the transport path in such a transport system, with the optical scanning unit being arranged at the vehicle such that it scans the code pattern on a movement of the vehicle along the transport path. In this manner, not only the movement path traveled by the vehicle can be determined, but the evaluation of the additional information also allows the provision of further data, preferably on the position at which the vehicle is currently located. A driverless transport system can thus e.g. be provided in a simple manner. Not only a linear movement along a predefined pathway can be considered here, but also a two-dimensional movement, free in principle, on a predefined surface.

The invention also relates to a conveying device for conveying goods on a transport surface, with an apparatus in accordance with the invention as described above being provided at a stationary carrier of the conveying device and at least one code pattern being applied to the movable transport surface such that it is scanned by the optical scanning unit on a movement of the transport surface. The conveying device can, for example, be a belt conveyor or band conveyor on whose support surface graphical code patterns are applied at special intervals, preferably at regular intervals. The code patterns can mark specific positions within the support surface or include data on the conveyed objects. The conveying device can therefore be coordinated better by reading the codes.

The object underlying the invention is furthermore satisfied by a method for position determination in which an optical scanning unit which includes an image sensor for detecting light intensity patterns of light which is reflected by a surface and which preferably includes an imaging optics for focusing the reflected light onto the image sensor is moved relative to the surface and a traveled movement path and/or a movement speed of the optical scanning unit relative to the surface is determined from a difference between light intensity patterns detected after one another in time. In accordance with the invention, a graphical code pattern located on the surface is recognized with reference to an intensity correlated signal which correlates with the intensity of the light reflected by the surface and information is read out of the code pattern. The information can, as set forth above, be further processed in different manners.

The invention will be described in the following by way of example with reference to the drawings.

Figure 1:
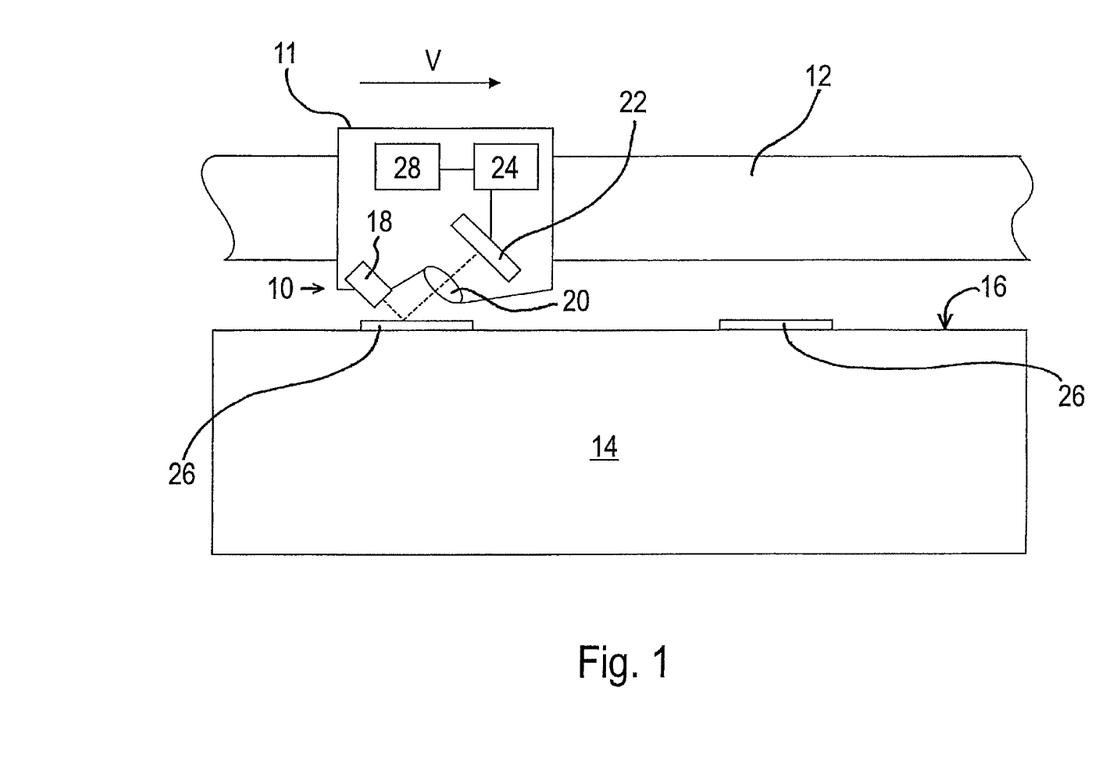
FIG. 1 is a simplified, partly sectioned side view of an apparatus for position determination in accordance with an embodiment of the invention.

In accordance with FIG. 1, the embodiment of the apparatus shown for position determination includes a housing 11 at whose lower side an optical scanning unit 10 is provided. The housing 11 is displaceable along a movement direction V on a guide rail 12. A component 14 with a planar surface 16 is located beneath the optical scanning unit 10. A light source 18 of the optical scanning unit 10, which can in particular be a light-emitting diode or a laser diode, is arranged such that it illuminates a section of the surface 16 obliquely from above. Light reflected from the surface 16 is focused by an imaging optics 20 onto an image sensor 22. The image sensor 22 is arranged in the interior of the housing 11 and is preferably configured as a CCD sensor or as a CMOS sensor which detects light intensity patterns pixel-wise and outputs corresponding electrical signals.

An electronic processing unit 24 is associated with the image sensor 22 and is likewise arranged in the housing 11 and is configured to determine a traveled movement path and/or a movement speed of the optical scanning unit 10 relative to the surface 16 from a difference between light intensity patterns detected after one another in time. The electronic processing unit 24 preferably works according to the principle of optical flow such as is generally also used in optical mouse devices.

Graphical code patterns 26 which are sampled or scanned by the optical scanning unit 10 when the housing 11 moves past them in the movement direction V are provided at a plurality of points of the surface 16. Every time the optical scanning unit 10 moves over one of the graphical code patterns 26 the corresponding code pattern 26 is recognized as such and information contained in it is read out. For this purpose, an electronic evaluation unit 28 is accommodated in the housing 11 and communicates with the electronic processing unit 24 and is able to detect the code patterns 26 and to output the information contained. In an embodiment, the information includes a position value which is used as a reference point or zero point for an absolute position determination. The graphical code patterns 26 preferably contain a barcode. The housing 11 could generally also be displaceable in two directions or areally.

Figure 2:
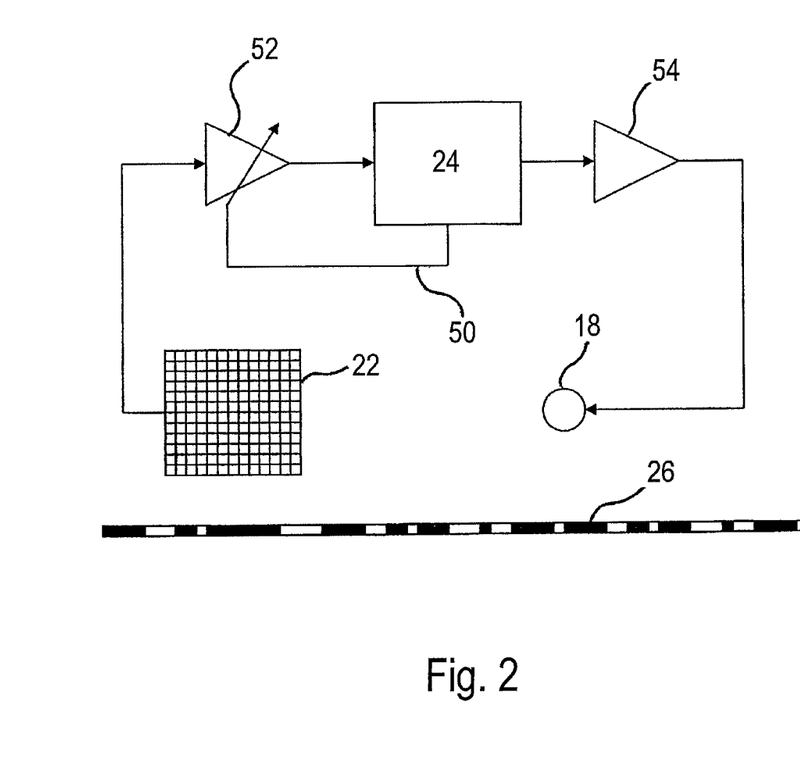
FIG. 2 is a part representation of the apparatus in accordance with FIG. 1 which shows the regulation of an input gain of a processing unit of the apparatus in accordance with FIG. 1.
Figure 3:
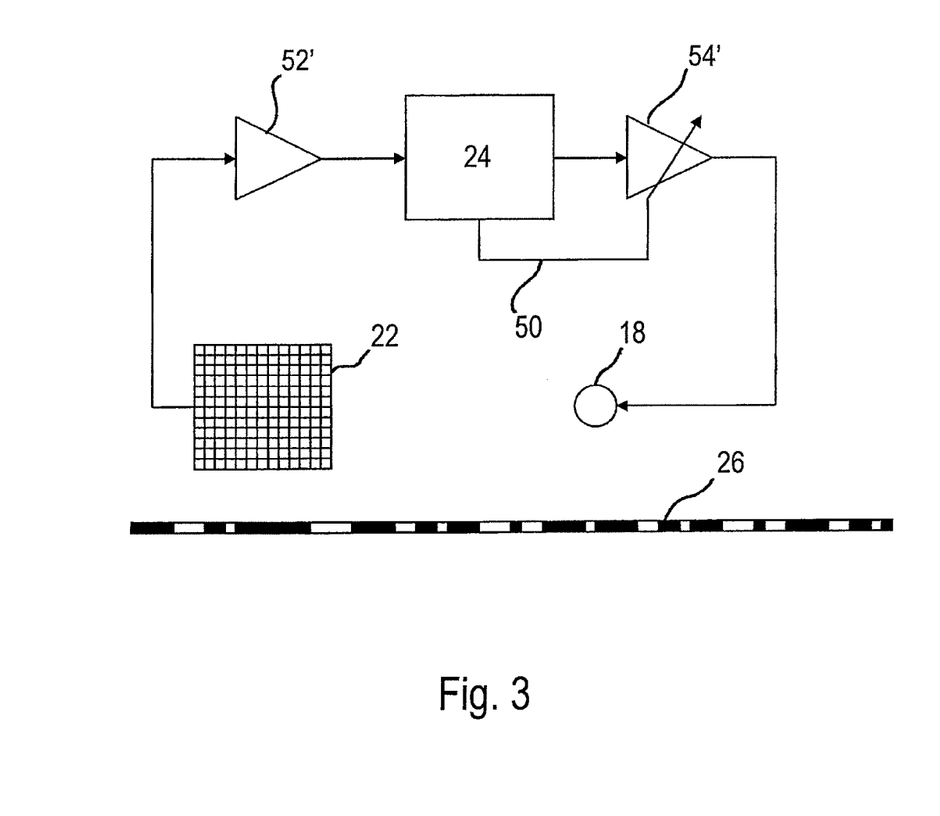
FIG. 3 is a part representation of the apparatus in accordance with FIG. 1 which shows the regulation of a power of a light source of the apparatus in accordance with FIG. 1 as an alternative to the variant in accordance with FIG. 2.

As will be explained in the following with reference to FIGS. 2 and 3, the recognition of the code patterns 26 and the reading out of the information takes place with reference to an intensity correlated signal 50 which is produced by the processing unit 24 and correlates as a summed signal or mean value signal with the intensity of the light reflected as a whole by the surface 16. The intensity correlated signal 50 could generally also be produced by a separate electronic processing unit.

The intensity correlated signal 50 can generally be used as an adjustment signal for regulating a gain factor. The intensity correlated signal 50 in accordance with FIG. 2 can specifically be supplied to an input amplifier 52 which can be regulated and is provided at the input side of the processing unit 24 to adapt the intensity signals of the image sensor 22. An output amplifier 54 provided at the output side of the processing unit 24 for adapting the power of the light source 18 remains uninfluenced in this respect. The intensity correlated signal 50 in accordance with FIG. 3 can alternatively be supplied to an output amplifier 54' which can be regulated and which is provided at the output side of the processing unit 24 to adapt the power of the light source 18. An input amplifier 52' provided a the input side of the processing unit 24 for adapting the intensity signals of the image sensor 22 remains uninfluenced in this respect. In this manner, a substantially unchanging total intensity can always be maintained and thus the dynamics of the system improved even with very differently reflective surfaces.

At the same time, the evaluation device 28 (FIG. 1) utilizes the intensity correlated signal 50 for recognizing the graphical code pattern 26 in that it derives a spatial development of the degree of reflection of the surface 16 given from the time development of the intensity correlated signal 50.

Figure 4:
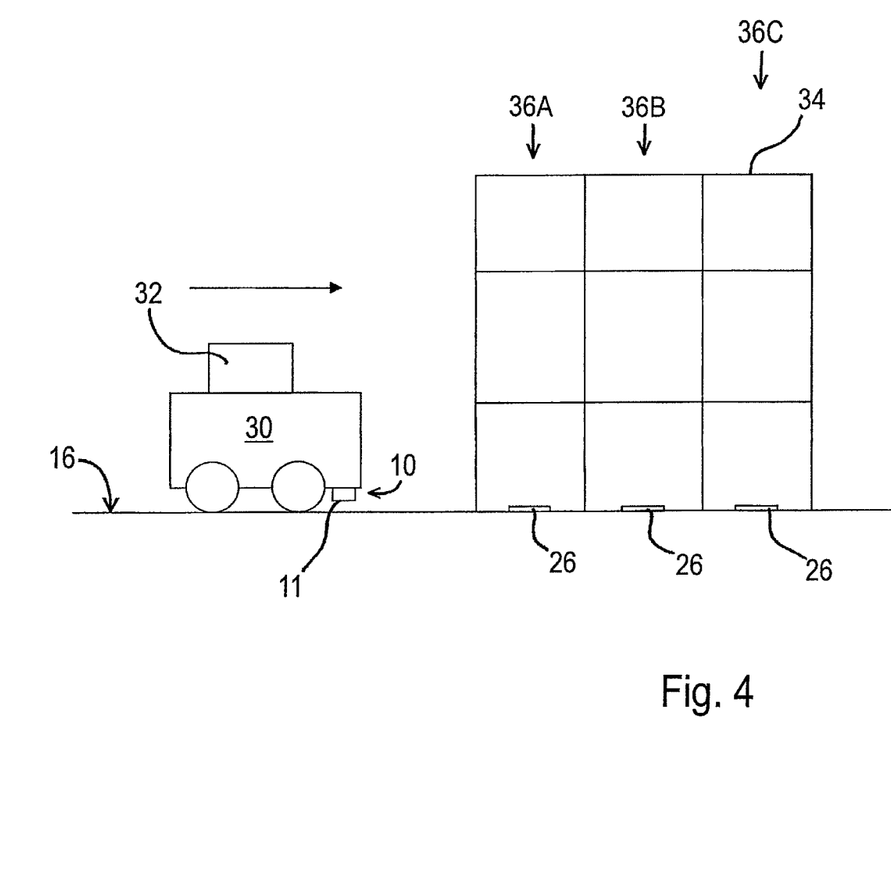
FIG. 4 is a simplified side view of a transport system in accordance with a further embodiment of the invention.

In the embodiment of the invention shown in FIG. 4, the optical scanning unit 10 is not attached to a guide rail, but rather to the lower side of a driverless vehicle 30 by means of which products 32 are transported to a high rack 34. The optical scanning unit 10 is in this respect attached to the vehicle 30 such that it is located closely above the surface 16 of the ground. A graphical code pattern 26 is applied to the ground in front of every column 36A, 36B, 36C of the high rack 34 and product identification information is encoded therein. The driverless vehicle 30 is controlled with the aid of the optical scanning unit 10. For this purpose, the movement path traveled is determined, on the one hand, and the product identification information is read out of the code pattern 26, on the other hand, when the optical scanning unit 10 scans it. Since information on the currently transported product 32 is still stored in an electronic memory unit, not shown, associated with the vehicle 30, the vehicle 30 can convey the product 32 up to that column 36A, 36B, 36C of the high stack 34 in which the product identification information of the code pattern 25 corresponds to the product information stored in the memory. A handling apparatus, likewise not shown, of the vehicle 30 or of the high stack 34 then transfers the product 32 from the vehicle 30 into the correct column 36A, 36B, 36C of the high stack 34. The removal of products 32 from the high stack 34 takes place in an analog manner.

Figure 5:
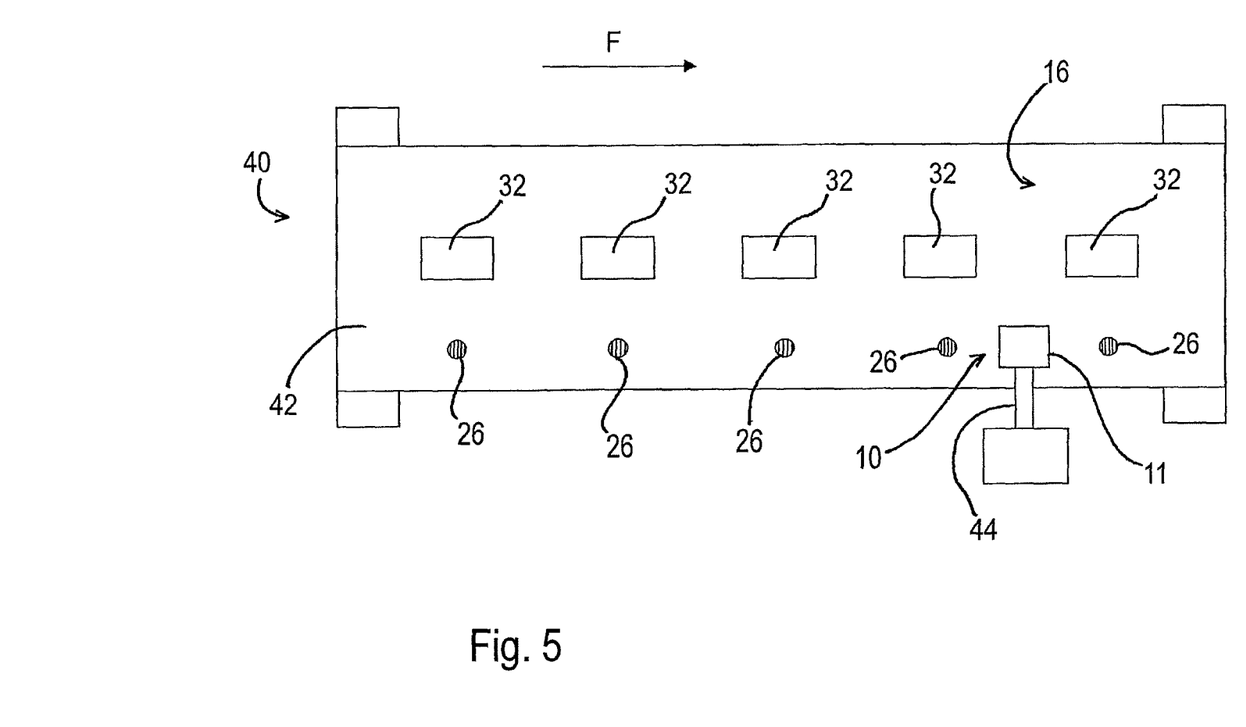
FIG. 5 is a simplified plan view of a conveying device in accordance with a further embodiment of the invention.

FIG. 5 shows a further embodiment of the invention in which the optical scanning unit 10 is associated with a belt conveyor 40. The belt conveyor 40 conveys products 32 along a conveying direction F on a conveyor belt 42. An optical scanning unit 10 is attached to a stationary carrier 44 next to the band conveyor 40 such that it moves closely over the support surface 16 of the conveyor belt 42. Graphical code patterns 26 which are scanned by the stationary optical scanning unit 10 during the conveying of products are furthermore applied to the conveyor belt 42 at regular intervals. The optical scanning unit 10 recognizes the kind of a conveyed product 32 with reference to the code patterns 26 and additionally the location of the product 32 within the support surface 16 of the conveyor belt 12 and outputs a corresponding signal to a control device, not shown of the belt conveyor 40. The signal is processed by the control device and a handling apparatus for removing the products from the conveyor belt 42 is controlled e.g. using the signal.

The invention makes a reliable provision of position values, including important additional data, possible over all, with the corresponding measurement device being able to be of particularly compact design and being inexpensive in manufacture.

REFERENCE NUMERAL LIST 10 optical scanning unit
11 housing
12 guide rail
14 component
16 surface
18 light source
20 imaging optics
22 image sensor
24 electronic processing unit
26 graphical code pattern
28 evaluation device
30 driverless vehicle
32 product
34 high stack
36A, 36B, 36C column
40 belt conveyor
42 conveyor belt
44 carrier
50 intensity correlated signal
52, 52' input amplifier
54, 54' output amplifier
V moving direction
F conveying direction

The invention claimed is:
1. An apparatus for position determination, having
an optical scanning unit (10) which is to be moved relative to a surface (16), the optical scanning unit including an image sensor (22) for detecting light intensity patterns of light which is reflected by the surface (16); and having an electronic processing unit (24) which is associated with the image sensor (22) and which is configured to determine a traveled movement path and/or a movement speed of the optical scanning unit (10) relative to the surface (16) from a difference between light intensity patterns detected after one another in time, wherein the or a further processing unit (24) is configured to produce an intensity correlated signal (50) which correlates with the intensity of the light reflected by the surface (16), wherein an evaluation device (28) is associated with the image sensor (22) and is configured to recognize a graphical code pattern (26) located on the surface (16) with respect to the intensity correlated signal (50) and to read out information from the code pattern (26), and wherein a regulator is provided which uses the intensity correlated signal (50) as an adjustment signal for regulating a gain factor of an input amplifier (52) of the processing unit (24) of the optical scanning unit (10) or for regulating a gain factor of an output amplifier (54) which adapts a power of a light source (18) of the optical scanning unit (10).

2. An apparatus in accordance with claim 1, wherein the optical scanning unit further includes an imaging optics (20) for focusing the light onto the image sensor (22).

3. An apparatus in accordance with claim 1,
wherein the evaluation device (28) is configured to derive a spatial development of the degree of reflection of the surface (16) given by the code pattern (26) for the recognition of the graphical code pattern (26) from a time development of the intensity correlated signal (50) during a movement of the optical scanning unit (20) relative to the surface (16).

4. An apparatus in accordance with claim 1,
wherein the optical scanning unit (10) includes a light source (18) for illuminating the surface (16).

5. An apparatus in accordance with claim 4,
wherein the light source is one of a light-emitting diode and a laser diode.

6. An apparatus in accordance with claim 1,
wherein the evaluation device is integrated into the electronic processing unit.

7. An apparatus in accordance with claim 1,
wherein the evaluation device (28) is designed as a further electronic processing unit.

8. An apparatus in accordance with claim 1,
wherein a regulator is provided which uses the intensity correlated signal (50) as an adjustment signal for regulating an input amplification of the processing unit (24) or of the power of a light source (18) of the optical scanning unit (10).

9. An apparatus in accordance with claim 1,
wherein the evaluation device (28) is configured to read out at least one position value representing the position of the optical scanning unit (10) relative to a reference point of the surface (16) from the code pattern (26).

10. An apparatus in accordance with claim 1,
wherein the evaluation device (28) is configured to read out information from the code reader (26) which describes a property of a reference point defined by the position of the code pattern (26) on the surface (16).

11. An apparatus in accordance with claim 10,
wherein the read out information is product identification information.

12. An apparatus in accordance with claim 1,
wherein the evaluation device (28) is configured to recognize a barcode.

13. A system with an apparatus for position determination having an optical scanning unit (10) which is to be moved relative to a surface (16), the optical scanning unit including an image sensor (22) for detecting light intensity patterns of light which is reflected by the surface (16); and having an electronic processing unit (24) which is associated with the image sensor (22) and which is configured to determine a traveled movement path and/or a movement speed of the optical scanning unit (10) relative to the surface (16) from a difference between light intensity patterns detected after one another in time, wherein the or a further processing unit (24) is configured to produce an intensity correlated signal (50) which correlates with the intensity of the light reflected by the surface (16), and wherein an evaluation device (28) is associated with the image sensor (22) and is configured to recognize a graphical code pattern (26) located on the surface (16) with respect to the intensity correlated signal (50) and to read out information from the code pattern (26), there being at least one information element which is configured for attachment to a surface and which includes a graphical code pattern (26) recognizable by the evaluation device (28).

14. A transport system including a vehicle (30) for conveying goods (32) along a predefined transport path and an apparatus for position determination having an optical scanning unit (10) which is to be moved relative to a surface (16), the optical scanning unit including an image sensor (22) for detecting light intensity patterns of light which is reflected by the surface (16); and having an electronic processing unit (24) which is associated with the image sensor (22) and which is configured to determine a traveled movement path and/or a movement speed of the optical scanning unit (10) relative to the surface (16) from a difference between light intensity patterns detected after one another in time, wherein the or a further processing unit (24) is configured to produce an intensity correlated signal (50) which correlates with the intensity of the light reflected by the surface (16), and wherein an evaluation device (28) is associated with the image sensor (22) and is configured to recognize a graphical code pattern (26) located on the surface (16) with respect to the intensity correlated signal (50) and to read out information from the code pattern (26) for determining the position of the vehicle on the transport path, wherein at least one code pattern (26) is arranged at the transport path, with the optical scanning unit (10) being arranged at the vehicle (30) such that it scans the code pattern (26) on a movement of the vehicle (30) along the transport path.

15. A conveying device (40) for conveying goods (32) on a transport surface (16) including an apparatus for position determination having an optical scanning unit (10) which is to be moved relative to a surface (16), the optical scanning unit including an image sensor (22) for detecting light intensity patterns of light which is reflected by the surface (16); and having an electronic processing unit (24) which is associated with the image sensor (22) and which is configured to determine a traveled movement path and/or a movement speed of the optical scanning unit (10) relative to the surface (16) from a difference between light intensity patterns detected after one another in time, wherein the or a further processing unit (24) is configured to produce an intensity correlated signal (50) which correlates with the intensity of the light reflected by the surface (16), and wherein an evaluation device (28) is associated with the image sensor (22) and is configured to recognize a graphical code pattern (26) located on the surface (16) with respect to the intensity correlated signal (50) and to read out information from the code pattern (26), the apparatus being provided at a stationary carrier (44) of the conveying device (40) and at least one said graphical code pattern (26) is applied to the moving transport surface (16) such that it is scanned by the optical scanning unit (10) on a movement of the transport surface (16).

16. A method for position determination comprising the steps:

moving an optical scanning unit (10) relative to the surface (16), said optical scanning unit including an image sensor (22) for detecting light intensity patterns of light which is reflected by a surface (16) and preferably including an imaging optics (20) for focusing the light onto the image sensor (22);

determining a traveled movement path and/or a moving speed of the optical scanning unit (10) relative to the surface (16) from a difference between light intensity patterns detected after one another in time, the method including the further steps of:

recognizing a graphical code pattern (26) located on the surface (16) with reference to an intensity correlated signal (50) which correlates with the intensity of the light reflected by the surface (16);

using the intensity correlated signal (50) as an adjustment signal for regulating a gain factor of an input amplifier (52) of a processing unit (24) of the optical scanning unit (10) or for regulating a gain factor of an output amplifier (54) which adapts a power of a light source (18) of the optical scanning unit (10); and reading out information from the code pattern (26).

* * * * *